United States Patent
Masiero et al.

(10) Patent No.: US 9,760,657 B2
(45) Date of Patent: Sep. 12, 2017

(54) TASK BASED SEMANTIC SEARCH

(71) Applicant: ADP, LLC, Roseland, NJ (US)

(72) Inventors: Roberto A. Masiero, Basking Ridge, NJ (US); Umakant Saraswat, Clifton, NJ (US); Mathew Skaria, East Hanover, NJ (US)

(73) Assignee: ADP, LLC, Roseland, NJ (US)

( * ) Notice: Subject to any disclaimer, the term of this patent is extended or adjusted under 35 U.S.C. 154(b) by 400 days.

(21) Appl. No.: 14/626,051

(22) Filed: Feb. 19, 2015

(65) Prior Publication Data

US 2016/0246840 A1    Aug. 25, 2016

(51) Int. Cl.
*G06F 17/30* (2006.01)

(52) U.S. Cl.
CPC .. *G06F 17/30967* (2013.01); *G06F 17/30979* (2013.01)

(58) Field of Classification Search
USPC .......................... 707/741, 748, 759, 760, 770
See application file for complete search history.

(56) References Cited

U.S. PATENT DOCUMENTS

| | | | |
|---|---|---|---|
| 6,108,645 A * | 8/2000 | Eichstaedt | G06F 17/30867 707/741 |
| 6,839,680 B1 * | 1/2005 | Liu | G06Q 30/0204 705/7.33 |
| 7,653,618 B2 | 1/2010 | Andreev et al. | |
| 8,510,250 B2 * | 8/2013 | Dagaeff | G06F 17/30522 382/165 |
| 8,620,909 B1 | 12/2013 | Rennison | |
| 8,868,560 B2 | 10/2014 | Spivack et al. | |
| 9,195,854 B2 * | 11/2015 | Jain | G06F 21/604 |
| 2011/0078205 A1 | 3/2011 | Salkeld et al. | |
| 2013/0066862 A1 | 3/2013 | Orr et al. | |
| 2013/0138588 A1 | 5/2013 | Mehta et al. | |
| 2016/0055210 A1 * | 2/2016 | Beavin | G06F 17/30466 707/754 |

OTHER PUBLICATIONS

Tomas Kramar, Utilizing Lightweight Semantics for Search Context Acquisition in Personalized Search, Institute of Informatics and Software Engineering; Faculty of Informatics and Information Technologies, Slovak University of Technology in Bratislava, Slovakia, 2014.

Evgeny Pyshkin et al, Approaches for Web Search User Interfaces, Dept. of Computer Systems and Software Engineering, Saint-Petersburg, Russian Federation, 2010.

* cited by examiner

*Primary Examiner* — Hung T Vy
(74) *Attorney, Agent, or Firm* — Patrick J. Daugherty; Driggs, Hogg, Daugherty & Del Zoppo Co., LPA

(57) ABSTRACT

Task-based semantic searches fetch user profile data including a role of the user within an enterprise entity from log-in identity data of the user in response to receiving a query text input. Object and task search predicates limit, as a function of the user role, scopes of objects returnable from search of an object index, and tasks returnable from search of a task index, in satisfaction of the query text as a function of the user role. Task and object index searching results are matched into task and object pairs that are allowed by the user role as a function of the enterprise entitlement system, and the task and object pairs are presented to the user in a graphical user interface as task-object pair hypertext references that invoke the task of each pair as a callable action on the object of each pair.

19 Claims, 2 Drawing Sheets

TASK BASED SEMANTIC SEARCH

BACKGROUND

Search engines are programmable device applications that search indexes, generally created via push mechanisms, on locally accessible data storage devices in response to query inputs. Search engines generally perform text searching, wherein a user provides a text input and the search engine finds information relevant thereto from a pool of target datasets. The sources searched may include storage devices local to a system running a search engine application as well as external devices, servers or systems in communication via private local area network (LAN), wide area network (WAN) and the Internet (the World Wide Web). Search results may include a list of hyperlinked results, each of which may lead a user to a variety of different results that include web pages, images, database files and entries and other types of files.

BRIEF SUMMARY

In one aspect of the present invention, a method for task-based semantic search includes fetching user profile data from log-in identity data of the user in response to receiving a query text input from a user. The fetched user profile data includes a role of the user within an enterprise entity. The method further builds one or more object search predicates that limit a scope of objects returnable from a search of an object index in satisfaction of the query text input as a function of the user role, wherein the object search predicates limit results returned from the search of the object index to objects enabled for access by the user role by an enterprise entitlement system. One or more task search predicates are built that limit a scope of tasks returnable from a search of a task index in satisfaction of the query text input as a function of the user role, wherein the task search predicates limit results returned from the search of the task index to tasks that are enabled by an enterprise entitlement system for execution upon enterprise data objects by the user role. Thus, the task index is searched for task results that match the query text input and meet conditions of the task search predicates, and the object index for object results that match the query text input and meet conditions of the object search predicates. The task and object index searching results are matched into task and object pairs that are allowed by the user role as a function of the enterprise entitlement system, and the task and object pairs are presented to the user in a graphical user interface as task-object pair hypertext references that invoke the task of each pair as a callable action on the object of each pair, namely in response to a selection by the user via a graphical user interface selection routine.

In another aspect, a system has a hardware processor in circuit communication with a computer readable memory and a computer-readable storage medium having program instructions stored thereon. The processor executes the program instructions stored on the computer-readable storage medium via the computer readable memory and thereby fetches user profile data from log-in identity data of the user in response to receiving a query text input from a user. The fetched user profile data includes a role of the user within an enterprise entity. The processor further builds one or more object search predicates that limit a scope of objects returnable from a search of an object index in satisfaction of the query text input as a function of the user role, wherein the object search predicates limit results returned from the search of the object index to objects enabled for access by the user role by an enterprise entitlement system. One or more task search predicates are built that limit a scope of tasks returnable from a search of a task index in satisfaction of the query text input as a function of the user role, wherein the task search predicates limit results returned from the search of the task index to tasks that are enabled by an enterprise entitlement system for execution upon enterprise data objects by the user role. Thus, the task index is searched for task results that match the query text input and meet conditions of the task search predicates, and the object index for object results that match the query text input and meet conditions of the object search predicates. The task and object index searching results are matched into task and object pairs that are allowed by the user role as a function of the enterprise entitlement system, and the task and object pairs are presented to the user in a graphical user interface as task-object pair hypertext references that invoke the task of each pair as a callable action on the object of each pair, namely in response to a selection by the user via a graphical user interface selection routine.

In another aspect, a computer program product for task-based semantic search has a computer-readable hardware storage device with computer readable program code embodied therewith. The computer readable program code includes instructions for execution which cause the processor to fetch user profile data from log-in identity data of the user in response to receiving a query text input from a user. The fetched user profile data includes a role of the user within an enterprise entity. The processor further builds one or more object search predicates that limit a scope of objects returnable from a search of an object index in satisfaction of the query text input as a function of the user role, wherein the object search predicates limit results returned from the search of the object index to objects enabled for access by the user role by an enterprise entitlement system. One or more task search predicates are built that limit a scope of tasks returnable from a search of a task index in satisfaction of the query text input as a function of the user role, wherein the task search predicates limit results returned from the search of the task index to tasks that are enabled by an enterprise entitlement system for execution upon enterprise data objects by the user role. Thus, the task index is searched for task results that match the query text input and meet conditions of the task search predicates, and the object index for object results that match the query text input and meet conditions of the object search predicates. The task and object index searching results are matched into task and object pairs that are allowed by the user role as a function of the enterprise entitlement system, and the task and object pairs are presented to the user in a graphical user interface as task-object pair hypertext references that invoke the task of each pair as a callable action on the object of each pair, namely in response to a selection by the user via a graphical user interface selection routine.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Figure 1:
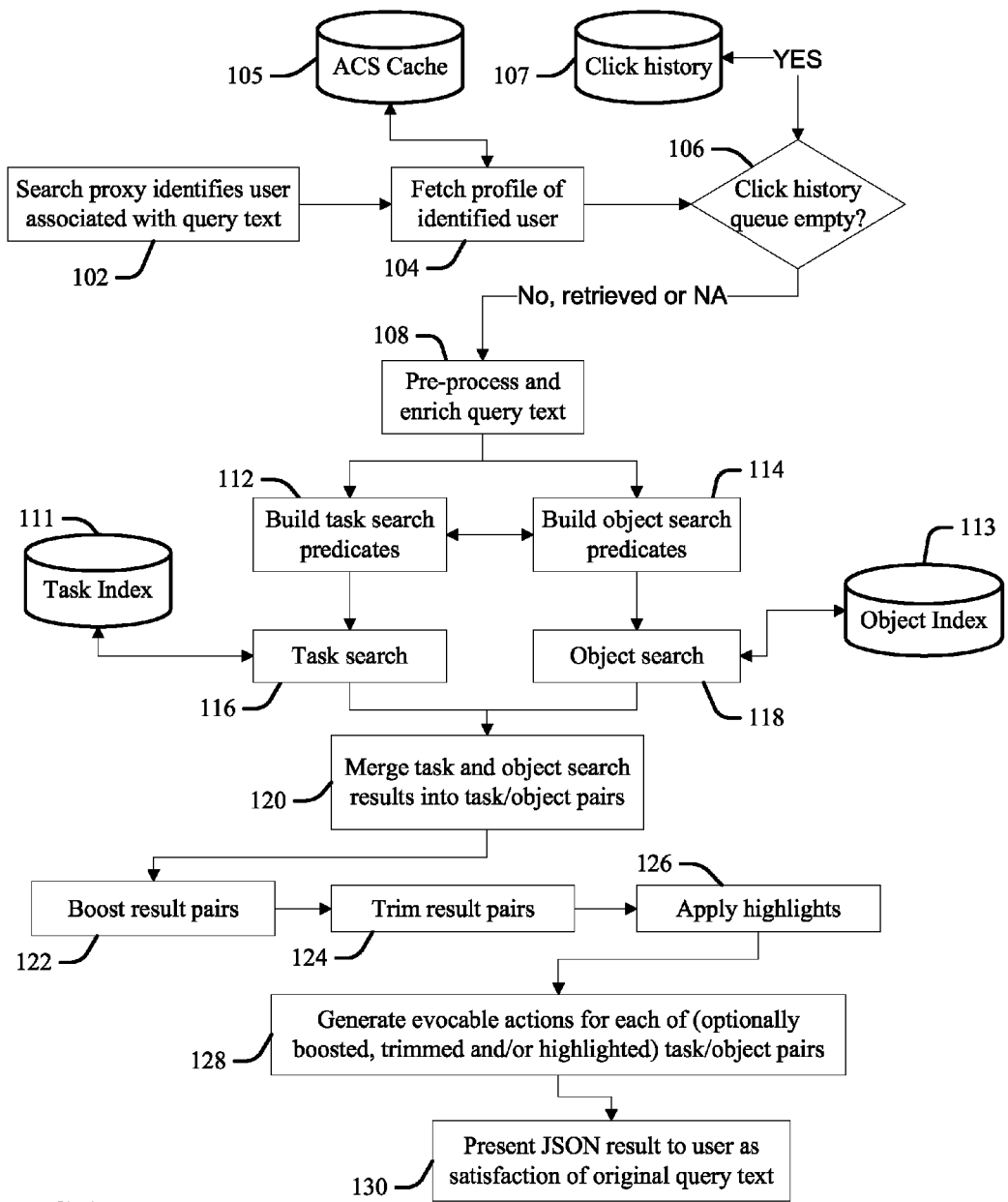
FIG. 1 is a flow chart illustration of a method or process aspect according to the present invention for task based semantic search.

FIG. 1 illustrates a method, process or system for task based semantic search according to the present invention. In response to receiving a query text via a Representational state transfer (REST), application programming interface (API) or other protocol, at 102 a server-side search proxy layer identifies a user associated with the query text. The identification is made at 102 by retrieving data associated with a log-in identity of the user, wherein the server-side resources of a business, organization, governmental department or other enterprise entity employing the user maintains identification data for the user associated with a unique user log on.

At 104 the search proxy fetches a user profile of the user as a function of the log-in identification, for example, from a server-side Access Control System (ACS) cache 105. The user profile identifies or defines a role of the user within the human resources domain of the enterprise entity, for example, "manager", "software programmer", "team leader", etc.

At 106 the process determines whether a system queue has a current list of "click through" activity by the user, and if not looks to a persistent, server side memory 107 to retrieve any click through history stored for the user. The click through history comprises a list of hypertext references ("HREF's") selected ("clicked on" via a graphical user interface routine) from results presented to the user by server side applications in previous searching of the server side resources by the user. Anytime the user has clicked on a result from presented search results it is kept within the queue 106 or the server side memory 107, generally by saving a maximum of twenty (20) document clicks per document type. If the click history is not empty, the click history is retrieved from the server side memory 107 or no click history is saved or available ("NA") from either the queue 106 or server side memory 107, at 106 the process moves on to step 108.

At 108 the query text is pre-processed and enriched into an enriched query text as a function of the click history or profile of the user. This includes recognizing multiple individual terms within the query text via simple tokenization, wherein text strings separated by white spaces are assumed to represent individual words, tasks, or objects (for example, names), etc., and therefore treated as individual strings to be searched independently against one or more indexes.

Individual text strings are also enriched into synonyms at 108, in some aspects as a function of the click history or profile of the user. For example, a text string "fire" in view of a role of the user as a manager of the enterprise (indicated by the fetched user profile) will result in enriching the query text by adding "terminate", "resource action", "lay-off" and/or "reassign" synonyms to the query text for use in searching enterprise resources as described below. The synonyms may also be indicated or verified by their presence within the user click history.

At 112 task search predicates are built to limit the scope of tasks returnable from a search of a server-side task index 111 in satisfaction of the query text strings as a function of the user role(s). The predicates are used to limit results returned to those that are enabled by an enterprise object entitlement system for roles of the user, in some aspects to ones executable on enterprise data objects. For example, the fetched user profile may indicate that the user is a manager, and accordingly search predicates may limit possible tasks returned from the task index 111 to "timesheet entry," "hiring", "firing", "leave time approval" and other tasks appropriate for a manager.

In some aspects, the task index 111 is an Apache Solr™ structure, an open source enterprise search engine platform from the Apache Lucene™ project that is scalable and provides full-text search, hit highlighting, faceted search, dynamic clustering, database integration, rich document handling and NoSQL ("not only structured query language") features. (APACHE SOLR and APACHE LUCERNE and trademarks of the Apache Software Foundation in the United States or other countries.) Solr runs as a standalone full-text search server within a servlet container and has REST-like HTTP/XML and JSON APIs that make it usable from most popular programming languages. However, this is only one illustrative example, and examples of the task index 111 are not limited to Solr structures.

At 114 object search predicates are built to limit the scope of objects returned from a search of an object index 113 in satisfaction of the query text strings as a function of the user role. The object search predicates limit the scope of objects returnable from a search of the object index 113 to objects which are enabled for access by mapping to features of the user role(s) by the enterprise object entitlement system. The object index 113 is a server-side resource that comprises data objects representing assets, attributes and entities of the enterprise, such as employee names, employee time sheets, independent contractors, candidates for hire, service providers, inventory goods, products, and still others will be apparent to one skilled in the arts. In some aspects, object index 113 is a Solr structure as described above; however, other index structures may be practiced. In some aspects, the building of the task and object predicates are linked, as shown in FIG. 1, with one set of built object or task predicates used to define the other set in a parallel and/or feedback process at either or both or 112 and 114. However, this is optional and building the respective task and object predicates at 112 and 114 may be independent of each other.

Thus, a "manager" role may result in an object search predicate that limits returned objects to names of employees within the enterprise that are supervised by the manager, candidates in consideration for hire, or time sheets of employees under supervision of the specific manager role, while excluding time sheets for other enterprise employees that are not within the ambit of the role (those of supervisors, or of employees under a different manager, etc.).

At 116 the task index 111 is searched for task results that match the enriched query text and meet conditions of (are filtered by) the task search predicates. At 118 the object index 113 is searched for object results that match the enriched query text and meet conditions of (are filtered by) the object search predicates. At 120 the results of said searches are merged into matching task and object pairs as a function of the user role(s) and the enterprise entitlement system.

More particularly, at 120 the search proxy matches the filtered object results to each of the filtered tasks that may be performed on them within the role(s) of the user in view of the entitlement system, determining which tasks may apply to which target objects as subjects. Thus, a "terminating" task may be matched to "worker" objects but not "candidates," as candidates have no meaningful status within the enterprise that is subject to termination. Matches of a "time entry" task may be limited to "timesheet" objects, "hiring" matched only to "candidates" or "job applicants," etc.

In one example, task results from a text query input of "Jo Ti" include "Time Entry," "Request Time-Off" and "Approve Time-Off Request" tasks as filtered matches to the "Ti" string portion at 116, and "John Smith", "John Doe" and "Jonathan Davis" employee object results as filtered matches to the "Jo" string portion at 118.

Aspects may iteratively execute the process of FIG. 1 in response to each text character input into a query input field in an "instant search" process. Thus, results presented to a user at 130 (described below) may change and revise in response to each additional text character input. In such examples, searching is dynamic, and incremental improvements or refinements of results with additional characters of each word may diminish as more characters are entered. For instance, searching the object index 113 for "Jo" may bring up people records for all people with first and/or last names beginning with (and/or including) "Jo", including "John", "Johnnie", "Jonathan", "Johnston", etc. As the user inputs more text, an optimal point may be reached when the user sees a presented choice as a desired choice and stops providing additional text query inputs. If the user adds "h" to the "Jo" string, the query results returned for "Joh" now excludes "Jonathan," but still includes "John", "Johnnie" and "Johnston." At this point, if the user is searching for records for "John," the user may have no incentive to add the next letter "n" to the string since query, as a text search for "John" will likely not make any significant improvement in the results. Such dynamic result presentments readily convey to users that that they only need to input minimum amounts of characters per word to get desired results. This may be desirable, as typing may not be very pleasant on a tablet or other input device, enabling the user to get results that are progressively narrowed by typing just a few additional characters. The search results presented are not a seemingly random collection of material with keyword match being the common thread bringing them together, but rather a semantically relevant set of choices capable of leading the user to one's goal.

Thus, a naive action mapping of results for the text query "Jo Ti" may result in generating the following task-object pairs at 120, wherein each task object is paired with a possible object target:

Time Entry>John Smith
Time Entry>John Doe
Time Entry>Jonathan Davis
Request Time-Off>John Smith
Request Time-Off>John Doe
Request Time-Off>Jonathan Davis
Approve Time-Off Request>John Smith
Approve Time-Off Request>John Doe
Approve Time-Off Request>Jonathan Davis In this example for clarity in illustration, there are no object name matches to "Ti" found in the object index 113, and no task matches to "Jo" in the task index 111, so the example results are grouped in respective task and object groupings for forming the task-object pairings. However, it will be understood that this example is not limiting, and that the tokenized strings are each searched against both of the object index 113 and the task index 111 and may return hits from either or both.

At 122 the generated task-object pairs are boosted or rank ordered. In some aspects, this prioritizes the pairs based on likelihood of match or selection by the user based on the returned click history, by boosting the task-object pairs which include tasks that were previously clicked through in the retrieved click-through activity history over others. Thus, if the click history indicates that the user has clicked through to execute a time entry task from previously presented results, the Time Entry pairings may be boosted over the other Request Time-Off and Approve Time-Off Request pairings. Or the role of the user as "manager" within this enterprise may indicate that the Approve Time-Off Request task is most likely to be selected, resulting in a boost for these pairings over the other task pairings.

At 124 the boosted task-object pairs are trimmed to eliminate unlikely or impermissible pairings as a function of the fetched user profile. For example, a user may "Request Time-Off" for him or herself within the role of employee, and "Approve Time-Off Requests" as a manager/supervisor only with respect to other employees. Thus, if the "John Doe" is the name of the user, and the fetched profile indicates a user role of manager/supervisor, then trimming the results at 124 may result in deleting the pairing of "Approve Time-Off Request>John Doe." If a user is a recruiter who mostly needs to search for requisitions and candidates rather than employees, it would be a subpar experience for the user if the engine continues to show employee records as top matching results, forcing the user to consistently scroll down to view the candidates and requisitions. Accordingly, aspects may entirely filter out hits of employees, or rank them below all candidate hits. The process thus makes user roles both searchable and readily applicable as filters to reduce the numbers of hits returned, or as categories used to organize, rank or boost the results.

Trimming may include application of enterprise security settings, which may restrict some task-object pairings, for example dropping all of the Approve Time-Off Request pairings unless the fetched user profile indicates that the user role has requisite authority within the enterprise. Trimming may also apply threshold limits to the total number of possible pairs, for example dropping all but the top twenty of the boosted task-object pairs where boosting the pairs at 122 rank-orders them with respect to relative likelihood of selection as a function of user role, click through history, etc.

At 126 highlights are applied to the boosted, trimmed task-object pairs. This includes highlighting the components of the task-object pairs that match the original query text: in our present example, highlighting the term "time" within each of the Time Entry, Approve Time-Off Request and Request Time-Off tasks to signify matching to the string "Ti", and the first names "John" and "Jonathan" within the paired objects to signify matching to the string "Jo".

At 128 evocable actions are generated for each of a pair of the boosted, trimmed, highlighted task-object pairs. For example, canonical HREFs are generated comprising hyper text mark-up language (HTML) code representing resources that are callable with the paired target object. Selection of the HREF thereby causes the resource to perform the task operation on the target object as identified by the text of the task-object pair.

At 130 the HREF's (or other evocable items) are presented as JSON results to the user within a graphical user interface (GUI), enabling the user to select and thereby invoke the callable action on the target object. Thus, selecting the presented "Approve Time-Off Request>John Doe" HREF causes a background human resources application to execute approval of a pending time-off request submitted by John Doe.

Thus, aspects of the present invention provide for intelligent text search. Search may be generally described as finding information in order to achieve something else: to carry out some business task, to reach out to a person, to gain some knowledge about something or someone, etc. What is desired by a user is not just pieces of textual content matching a given text query, but rather paths that can be taken to achieve a final goal, wherein search results are choices or decision points that each offer a choice that can lead us down a certain path of activity. Aspects use the fetched user profiles and click-through histories to understand the user's intent, to thereby go beyond mere text matching and present user navigational choices that the user is likely to pursue, in some aspects winnowing and selecting (ranking, boosting) a subset of all possible choices. By tracking click-through data, the process dynamically responds to recent user activity. The decision process is not static, but instead may keep changing in response to every selection keystroke.

Tasks presented for execution by HREF may also be limited to certain employees via the application of background security and entitlement systems. For example, enterprise entitlement systems may limit approval of time-off requests by a user in the role of manager to members of a team under direct supervision of the manager role, and not allow such approvals for other employees who may have similar roles but are assigned to another team under another manager. Thus, for a manager user John Smith wherein Johnathan Davis is on the manager's team, but John Doe is not, the naïve mapping list may be reduced by trimming at 124 to the following:

Time Entry>John Smith
Request Time-Off>John Smith
Approve Time-Off Request>Johnathan Davis The final presentment at 130 is not just a mapping of all object hits against all possible/likely tasks, but a limited list of object and tasks pairings that are permissible, or are most likely to satisfy the user query. In some examples, other combinations not generally permitted or likely may still be presented, but ranked lower than the other possible or more probable or likely result-task mappings. Thus, the presentment of boosted and trimmed evocable action mappings takes into account the user's authorization for not just a task behind the action, but also for the subjects to be mapped, leading to a simple and intuitive user experience.

Aspects of the present invention include systems, methods and computer program products that implement the examples described above. A computer program product may include a computer-readable hardware storage device medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
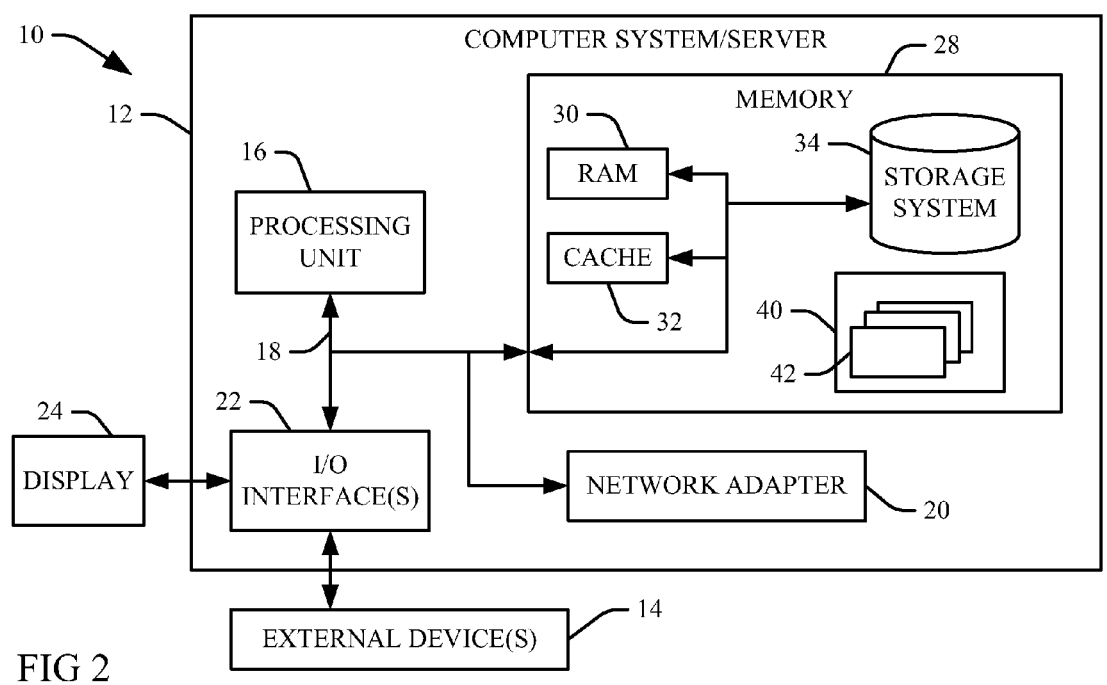
FIG. 2 depicts a computer device according to the present invention.

Referring now to FIG. 2, a computer system/server 12 is operational with numerous other computing system environments or configurations for task based semantic search according to the present invention. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In one aspect, a service provider may perform process steps of the invention on a subscription, advertising, and/or fee basis. That is, a service provider could offer to integrate computer-readable program code into the computer system/server 12 to enable the computer system/server 12 to perform task based semantic search as discussed in the Figures. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer-readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for task-based semantic search, the method comprising executing on a processor the steps of:

in response to receiving a query text input from a user, fetching user profile data from log-in identity data of the user, wherein the fetched user profile data comprises a role of the user within an enterprise entity;

building at least one object search predicate that limits a scope of objects returnable from a search of an object index in satisfaction of the query text input as a function of the user role, wherein the at least one object search predicate limits results returned from the search of the object index to objects enabled for access by the user role by an enterprise entitlement system;

building at least one task search predicate that limits a scope of tasks returnable from a search of a task index in satisfaction of the query text input as a function of the user role, wherein the at least one task search predicate limits results returned from the search of the task index to tasks that are enabled by an enterprise entitlement system for execution upon enterprise data objects by the user role;

searching the task index for task results that match the query text input and meet conditions of the task search predicates;

searching the object index for object results that match the query text input and meet conditions of the object search predicates;

matching the task results of said task index searching and the object results of said object index searching into task and object pairs that are allowed by the user role as a function of the enterprise entitlement system; and presenting the task and object pairs to the user in a graphical user interface as task-object pair hypertext references that invoke the task of each pair as a callable action on the object of each pair in response to a selection by the user via a graphical user interface selection routine.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the steps of fetching the user profile data from the log-in identity data, building the at least one object search predicate, building the at least one task search predicate, searching the task index for the task results, searching the object index for the object results, matching the task results and the object results into the task and object pairs and presenting the task and object pairs in the graphical user interface as the task-object pair hypertext references.

3. The method of claim 1, further comprising:

retrieving a click-through activity history of the user from a persistent server-side memory medium of the enterprise entity; and rank ordering the task-object pair hypertext references by boosting those of the task-object pair hypertext references that include tasks that were previously clicked through on in the retrieved click-through activity history over others of the task-object pair hypertext references that include tasks that were not previously clicked through on in the retrieved click-through activity history.

4. The method of claim 3, further comprising:

expanding the query text input into an enriched query that comprises at least one additional task text term that is a synonym of a text string of a task within the query text input and is enabled by the enterprise entitlement system for execution upon enterprise data objects by the user role; and wherein the steps of searching the task index for the task results that match the query text input and meet the conditions of the task search predicates and searching the object index for the object results that match the query text input and meet the conditions of the object search predicates comprise searching the task index for the task results that match the enriched query, and searching the object index for the object results that match the enriched query.

5. The method of claim 4, wherein the step of expanding the query text input into the enriched query with the at least one additional task text term is further a function of determining that the at least one additional task text term was previously clicked through on in the retrieved click-through activity history.

6. The method of claim 5, further comprising:
recognizing multiple individual string terms within the query text input via separation by white space within the query text input; and
wherein the steps of searching the task index for the task results that match the query text input and meet the conditions of the task search predicates and searching the object index for the object results that match the query text input and meet the conditions of the object search predicates comprise searching the task index for the task results that match ones of each of the multiple individual string terms, and searching the object index for the object results that match ones of each of the multiple individual string terms.

7. The method of claim 6, wherein the query text is received via a representational state transfer protocol of an application programming interface; and
wherein the steps of fetching the user profile data, building the at least one object search predicate and the at least one task search predicate, searching the task index, searching the object index and matching the task results and the object results into the task and object pairs are performed within a search proxy layer of the application programming interface.

8. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
fetches user profile data from log-in identity data of a user in response to receiving a query text input from the user, wherein the fetched user profile data comprises a role of the user within an enterprise entity;
builds at least one object search predicate that limits a scope of objects returnable from a search of an object index in satisfaction of the query text input as a function of the user role, wherein the at least one object search predicate limits results returned from the search of the object index to objects enabled for access by the user role by an enterprise entitlement system;
builds at least one task search predicate that limits a scope of tasks returnable from a search of a task index in satisfaction of the query text input as a function of the user role, wherein the at least one task search predicate limits results returned from the search of the task index to tasks that are enabled by an enterprise entitlement system for execution upon enterprise data objects by the user role;
searches the task index for task results that match the query text input and meet conditions of the task search predicates;
searches the object index for object results that match the query text input and meet conditions of the object search predicates;
matches the task results of said task index searching and the object results of said object index searching into task and object pairs that are allowed by the user role as a function of the enterprise entitlement system; and
presents the task and object pairs to the user in a graphical user interface as task-object pair hypertext references that invoke the task of each pair as a callable action on the object of each pair in response to a selection by the user via a graphical user interface selection routine.

9. The system of claim 8, wherein the processor executes the program instructions stored on the computer-readable storage medium via the computer readable memory and thereby further:
retrieves a click-through activity history of the user from a persistent server-side memory medium of the enterprise entity; and
rank orders the task-object pair hypertext references by boosting those of the task-object pair hypertext references that include tasks that were previously clicked through on in the retrieved click-through activity history over others of the task-object pair hypertext references that include tasks that were not previously clicked through on in the retrieved click-through activity history.

10. The system of claim 9, wherein the processor executes the program instructions stored on the computer-readable storage medium via the computer readable memory and thereby further:
expands the query text input into an enriched query that comprises at least one additional task text term that is a synonym of a text string of a task within the query text input and is enabled by the enterprise entitlement system for execution upon enterprise data objects by the user role;
searches the task index for the task results that match the query text input and meet the conditions of the task search predicates by searching the task index for the task results that match the enriched query; and
searches the object index for the object results that match the query text input and meet the conditions of the object search predicates by searching the object index for the object results that match the enriched query.

11. The system of claim 10, wherein the processor executes the program instructions stored on the computer-readable storage medium via the computer readable memory and thereby expands the query text input into the enriched query with the at least one additional task text term as a function of determining that the at least one additional task text term was previously clicked through on in the retrieved click-through activity history.

12. The system of claim 11, wherein the processor executes the program instructions stored on the computer-readable storage medium via the computer readable memory and thereby further:
recognizes multiple individual string terms within the query text input via separation by white space within the query text input;
searches the task index for the task results that match the query text input and meet the conditions of the task search predicates by searching the task index for the task results that match ones of each of the multiple individual string terms; and
searches the object index for the object results that match the query text input and meet the conditions of the object search predicates by searching the object index for the object results that match ones of each of the multiple individual string terms.

13. The system of claim 12, wherein the query text is received via a representational state transfer protocol of an application programming interface; and wherein the processor executes the program instructions stored on the computer-readable storage medium via the computer readable memory and thereby fetches the user profile data, builds the at least one object search predicate and the at least one task search predicate, searches the task index and the object index and matches the task results and the object results into the task and object pairs within a search proxy layer of the application programming interface.

14. A computer program product for task-based semantic search, the computer program product comprising:

a computer readable hardware storage device having computer readable program code embodied therewith, wherein the computer readable hardware storage device is not a transitory signal per se, the computer readable program code comprising instructions for execution by a processor that cause the processor to:

fetch user profile data from log-in identity data of a user in response to receiving a query text input from the user, wherein the fetched user profile data comprises a role of the user within an enterprise entity;

build at least one object search predicate that limits a scope of objects returnable from a search of an object index in satisfaction of the query text input as a function of the user role, wherein the at least one object search predicate limits results returned from the search of the object index to objects enabled for access by the user role by an enterprise entitlement system;

build at least one task search predicate that limits a scope of tasks returnable from a search of a task index in satisfaction of the query text input as a function of the user role, wherein the at least one task search predicate limits results returned from the search of the task index to tasks that are enabled by an enterprise entitlement system for execution upon enterprise data objects by the user role;

search the task index for task results that match the query text input and meet conditions of the task search predicates;

search the object index for object results that match the query text input and meet conditions of the object search predicates;

match the task results of said task index searching and the object results of said object index searching into task and object pairs that are allowed by the user role as a function of the enterprise entitlement system; and present the task and object pairs to the user in a graphical user interface as task-object pair hypertext references that invoke the task of each pair as a callable action on the object of each pair in response to a selection by the user via a graphical user interface selection routine.

15. The computer program product of claim 14, wherein the computer readable program code instructions for execution by the processor further cause the processor to:

retrieve a click-through activity history of the user from a persistent server-side memory medium of the enterprise entity; and rank order the task-object pair hypertext references by boosting those of the task-object pair hypertext references that include tasks that were previously clicked through on in the retrieved click-through activity history over others of the task-object pair hypertext references that include tasks that were not previously clicked through on in the retrieved click-through activity history.

16. The computer program product of claim 15, wherein the computer readable program code instructions for execution by the processor further cause the processor to:

expand the query text input into an enriched query that comprises at least one additional task text term that is a synonym of a text string of a task within the query text input and is enabled by the enterprise entitlement system for execution upon enterprise data objects by the user role;

search the task index for the task results that match the query text input and meet the conditions of the task search predicates by searching the task index for the task results that match the enriched query; and search the object index for the object results that match the query text input and meet the conditions of the object search predicates by searching the object index for the object results that match the enriched query.

17. The computer program product of claim 16, wherein the computer readable program code instructions for execution by the processor further cause the processor to expand the query text input into the enriched query with the at least one additional task text term as a function of determining that the at least one additional task text term was previously clicked through on in the retrieved click-through activity history.

18. The computer program product of claim 17, wherein the computer readable program code instructions for execution by the processor further cause the processor to:

recognize multiple individual string terms within the query text input via separation by white space within the query text input;

search the task index for the task results that match the query text input and meet the conditions of the task search predicates by searching the task index for the task results that match ones of each of the multiple individual string terms; and search the object index for the object results that match the query text input and meet the conditions of the object search predicates by searching the object index for the object results that match ones of each of the multiple individual string terms.

19. The computer program product of claim 18, wherein the query text is received via a representational state transfer protocol of an application programming interface; and wherein the computer readable program code instructions for execution by the processor further cause the processor to fetch the user profile data, build the at least one object search predicate and the at least one task search predicate, search the task index and the object index and match the task results and the object results into the task and object pairs within a search proxy layer of the application programming interface.

* * * * *